US012786679B2

(12) United States Patent
Eisner

(10) Patent No.: US 12,786,679 B2
(45) Date of Patent: Nov. 3, 2026

(54) DEVICE BASED ENHANCED EMERGENCY NETWORK OUTAGE AWARENESS

(71) Applicant: Verizon Patent and Licensing Inc., Basking Ridge, NJ (US)

(72) Inventor: Gerald Robert Eisner, Pickerington, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 344 days.

(21) Appl. No.: 18/442,553

(22) Filed: Feb. 15, 2024

(65) Prior Publication Data

US 2025/0267441 A1 Aug. 21, 2025

(51) Int. Cl.

| | |
|---|---|
| ***H04W 4/90*** | (2018.01) |
| ***H04M 3/51*** | (2006.01) |
| ***H04W 24/04*** | (2009.01) |
| ***H04W 64/00*** | (2009.01) |

(52) U.S. Cl.

CPC ........... *H04W 4/90* (2018.02); *H04M 3/5116* (2013.01); *H04W 24/04* (2013.01); *H04W 64/006* (2013.01)

(58) Field of Classification Search

CPC ..... H04W 4/90; H04W 24/04; H04W 64/006; H04W 76/50; H04M 3/5116

See application file for complete search history.

(56) References Cited

U.S. PATENT DOCUMENTS

| | | | | |
|---|---|---|---|---|
| 8,451,987 | B1 * | 5/2013 | Rozier | H04W 24/08 379/39 |
| 8,599,802 | B2 * | 12/2013 | Sammour | H04W 76/27 370/312 |
| 10,015,041 | B2 * | 7/2018 | O'Reirdan | H04W 24/04 |
| 11,012,874 | B1 * | 5/2021 | Ananth | H04B 7/18504 |
| 11,956,855 | B2 * | 4/2024 | Klein | H04W 8/12 |
| 2004/0017311 | A1 * | 1/2004 | Thomas | G01S 5/0215 342/450 |
| 2008/0101553 | A1 * | 5/2008 | Goldman | H04M 3/5116 379/45 |
| 2009/0227224 | A1 * | 9/2009 | Aftelak | H04M 11/04 455/404.2 |
| 2012/0046009 | A1 * | 2/2012 | Persson | H04M 1/724094 455/404.1 |
| 2013/0149987 | A1 * | 6/2013 | Cheng | H04L 45/306 455/404.1 |
| 2014/0173415 | A1 * | 6/2014 | Kattil Cherian | G06F 11/00 715/234 |
| 2015/0358797 | A1 * | 12/2015 | Du | H04W 76/50 455/404.1 |
| 2017/0094490 | A1 * | 3/2017 | Ryan | H04W 4/90 |
| 2019/0132725 | A1 * | 5/2019 | Venkataramanan | H04W 24/08 |

(Continued)

FOREIGN PATENT DOCUMENTS

| | | | | |
|---|---|---|---|---|
| JP | 2009504108 A | * | 1/2009 | H04W 12/00 |

*Primary Examiner* — Charles T Shedrick

(57) ABSTRACT

A method, a device, and a non-transitory storage medium provide an enhanced emergency call outage reporting service. A network device receives an emergency call notice message. The emergency call notice message indicates that an emergency call was placed from a user equipment (UE) device using a visited network. The network device compares the emergency call notice message with outage data for a home network and reports, based on the comparing, a network outage associated with the emergency call notice message.

20 Claims, 8 Drawing Sheets

(56) References Cited

U.S. PATENT DOCUMENTS

| | | | | |
|---|---|---|---|---|
| 2019/0182734 A1* | 6/2019 | Laliberte | ................. | H04L 65/10 |
| 2020/0314621 A1* | 10/2020 | Cohen | ................... | H04W 76/50 |
| 2023/0136118 A1* | 5/2023 | Watfa | .................... | H04W 8/065 455/404.1 |
| 2025/0133369 A1* | 4/2025 | Freeman | ............... | H04W 4/024 |
| 2025/0337665 A1* | 10/2025 | Minnoni | ................. | H04L 43/06 |

* cited by examiner

DEVICE BASED ENHANCED EMERGENCY NETWORK OUTAGE AWARENESS

BACKGROUND INFORMATION

Enhanced 911 (or E911) service is a feature of the 911 emergency-calling system that automatically associates a physical address with a calling party's Automatic Number Identification (ANI). The E911 service provides emergency responders with information identifying the location of the caller without the calling party/person having to provide it. Emergency calls are generally routed to a Public Safety Answering Point (PSAP) at a location remote from the caller. Based on the caller's situation, the PSAP may dispatch appropriate emergency response personnel. When a user places a 911 call from a mobile device, if the user's home network is not available, a competitor's network can be used to make and deliver the emergency call.

DETAILED DESCRIPTION

The following detailed description refers to the accompanying drawings. The same reference numbers in different drawings may identify the same or similar elements. Also, the following detailed description does not limit the invention.

Systems and methods described herein provide an emergency call outage reporting service to improve a wireless carrier's awareness of network outages that impact an emergency call (e.g., a 911 call) system. When a User Equipment (UE) device is within its home coverage area or in an area where its service provider has no roaming partners, and it is not able to connect to its home network to place an emergency call, the call may default to another reachable network that may be associated with an alternate carrier. For example, if the alternate carrier was not impacted by conditions that caused disruption to the home network, the alternate carrier may deliver the 911 call on the alternate carrier's network even if a user-specific roaming agreement is not in place.

Current regulations require that, under certain conditions, a carrier shall report network outages affecting emergency calls to appropriate Public Safety Answering Points (PSAPs) and/or other agencies. Carriers typically have a variety of network availability tools to detect and process when network elements or circuits fail. However, if an emergency call is successfully connected by an alternate carrier, the home network may not be aware that an emergency call from one of their subscribers was carried on an alternate carrier's network. As a result, the home network carrier may notify a PSAP or other agency unnecessarily when alternate carrier networks are available to accept and deliver emergency calls. This scenario may be especially relevant when there is no third-party emergency call location determination capability in place. Thus, the home network would benefit from additional information to accurately assess and report the impact of a network outage on emergency calls.

Implementations described herein enable UE devices to detect and report network outages affecting emergency calls. Machine-readable code or a software package is installed or embedded in a UE device capable of initiating an emergency call using a wireless network (also referred to as a mobile network) connection. The UE device may evaluate the called party number to detect an emergency call; identify the wireless network used to complete the call; capture the date, time, and location of the UE device at the time the emergency call was initiated; and provides a notification if certain reporting criteria are met. The reporting criteria may include, for example, (a) that the called party number is 911, 999, 112 or any other supported emergency number in place based on the location of the UE device initiating the call; (b) that the call was successfully completed to a network; and (c) that the network used to complete the call is not the registered home network.

Figure 1:
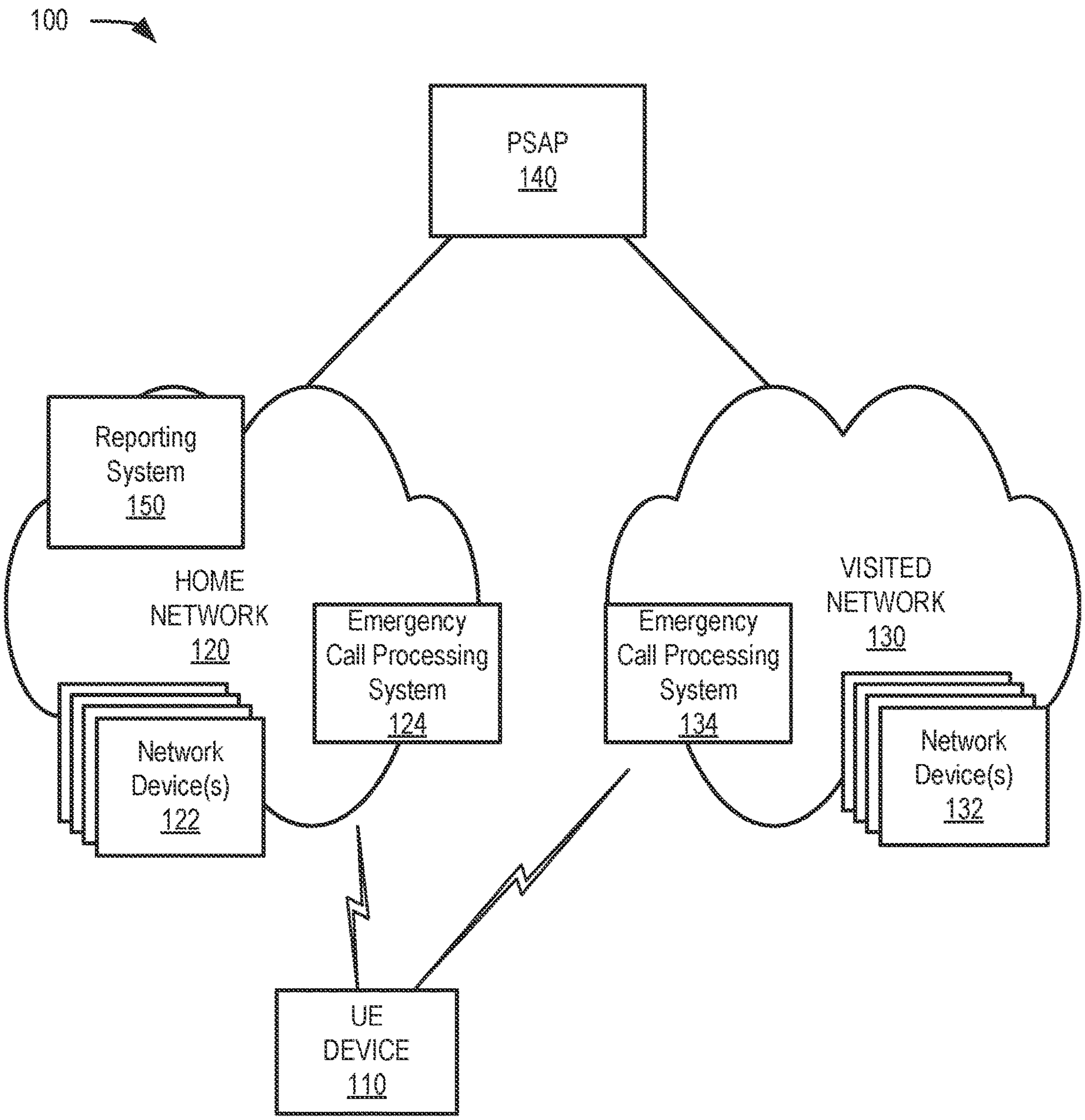
FIG. 1 provides an example of an environment in which an emergency call outage reporting service may be implemented.

FIG. 1 provides an overview of a network environment 100 in which an emergency call outage reporting service may be implemented. As shown, network environment 100 may include UE device 110, a home network 120, a visited network 130, a Public Safety Answering Point (PSAP) 140, and a reporting system 150.

UE device 110 may include a wireless communication device. Examples of UE device 110 include a cellular telephone device (e.g., a conventional cell phone with data processing capabilities), a smart phone, a personal digital assistant (PDA) that can include a radiotelephone, a wearable computer (e.g., a smart watch), a vehicle telematics system, etc. UE device 110 may store, for example, a home network ID or other indicator that identifies the home network of a subscriber. According to implementations described herein, UE device 110 may be configured to generate emergency call notice messages for an emergency call outage reporting service, as described further herein.

Home network 120 may include a network of a wireless carrier that is associated with UE device 110 via a subscription. Home network 120 may be a default/primary network for providing service, including emergency call service, to UE device 110. Home network 120 may include, for example, a radio access network (RAN), a core network, and other networks. For example, home network 120 may include a local area network (LAN), a wireless LAN, a wide area network (WAN), a metropolitan area network (MAN), an optical network, a cable television network, a satellite network, a wireless network (e.g., a Code Division Multiple Access (CDMA) network, a general packet radio service (GPRS) network, a Long Term Evolution (LTE) network (e.g., 4G network), a 5G network, a 6G network, an ad hoc network, a telephone network (e.g., the Public Switched Telephone Network (PSTN) or a cellular network), an intranet, or a combination of networks. Network 120 may allow the delivery of Internet Protocol (IP) services to UE device 110 and may interface with and/or include other networks, such as a packet data network.

Depending on the implementation, home network 120 may include one or multiple types of network devices 122. For example, a network device 122 may include a next generation Node B (gNB), an enhanced LTE (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a distributed unit (DU), a small cell node (e.g., a picocell device, a femtocell device, a microcell device, a home eNB, a home gNB, etc.), a 5G ultra-wide band (UWB) node, a future generation wireless access device (e.g., a 7G wireless station, a 7G wireless station, or another generation of wireless station). In other implementation, network device 122 may include core network devices, such as a user plane function (UPF), a Non-3GPP Interworking Function (N3IWF), an access and mobility management function (AMF), a session management function (SMF), a unified data management (UDM) device, an authentication server function (AUSF), a security anchor function (SEAF), a network slice selection function (NSSF), a network repository function (NRF), a policy control function (PCF), a network exposure function (NEF), a service capability exposure function (SCEF), a mobility management entity (MME), a packet data network gateway (PGW), a serving gateway (SGW), a home subscriber server (HSS), an authentication, authorization, and accounting (AAA) server, a policy and charging rules function (PCRF), and/or a charging system (CS). According to other implementations, network devices 122 may include additional, different, and/or fewer network devices than those described. For example, a network device 122 may include a gateway, a router, a switch, a firewall, a bridge, a proxy server, a server, or some other type of device that processes and/or transfers data.

Emergency call processing system 124 may include a computing a network device (e.g., one of network devices 122) that manages emergency calls received by home network 120. In one implementation, emergency call processing system 124 may operate on data on behalf of a network (e.g., home network 120) and may serve as an entrance to another network (e.g., an emergency services network of multiple PSAPs). Emergency call processing system 124 may route an emergency call from a calling device (e.g., UE device 110) to PSAP 140. In some implementations, emergency call processing system 124 also may identify certain location or source information of the calling device.

Visited network 130 may include a network of a wireless carrier that is not a home network for UE device (e.g., the network that is not registered as a primary network for the UE device 120). For example, visited network 130 may be associated with a wireless carrier that supports a roaming agreement for UE device 120 or that otherwise may be able to support emergency calls when home network 120 is not available to UE device 110. Visited network 130 may generally include features similar to those of home network 120 and have network devices 132 similar to those described above for home network 120 and network devices 122. In some implementations, visited network 130 may include an emergency call processing system 134 to direct emergency calls to an appropriate PSAP 140. However, as a visited network, some of the emergency call processing system capabilities of a home network are not typically available to a visiting UE device 110 in the handling of an emergency call.

PSAP 140 may include one or more entities that are responsible for answering emergency calls for emergency assistance from, e.g., police, fire, ambulance and/or other services. PSAP 140 may include one or more user devices, network devices, and/or other communication devices that service emergency calls, such as calls from UE device 110. In one implementation, PSAP 140 may receive emergency calls routed through emergency call processing system 124 or 134. In another implementation, PSAP 140 may communicate with emergency personnel (e.g., police, fire, and/or ambulance services) (not shown) to provide information associated with emergency calls.

Reporting system 150 may include one or more computing devices or network devices (e.g., one or more network devices 122) that receives incoming emergency call notice messages from UE devices 110. Reporting system 150 may compare each incoming message against a record of known outages in home network 120. Based on the comparison, reporting system 150 may assign a category code to the incoming message. For example, reporting system 150 may indicate that the incoming message is related to a known network outage, that the message is related to a UE device within a network service area but is not related to a known outage, or that the message is related to a UE device outside a network service area and is not related to a known outage. Based on the assigned category code, reporting system 150 may provide the emergency call notice message to an appropriate entity.

The number of devices, the number of networks, and the configuration in environment 100 are exemplary. According to other embodiments, environment 100 may include additional devices, fewer devices, and/or differently arranged devices, than those illustrated in FIG. 1. For example, according to other embodiments, environment 100 may include additional wired and/or wireless networks.

Figure 2A:
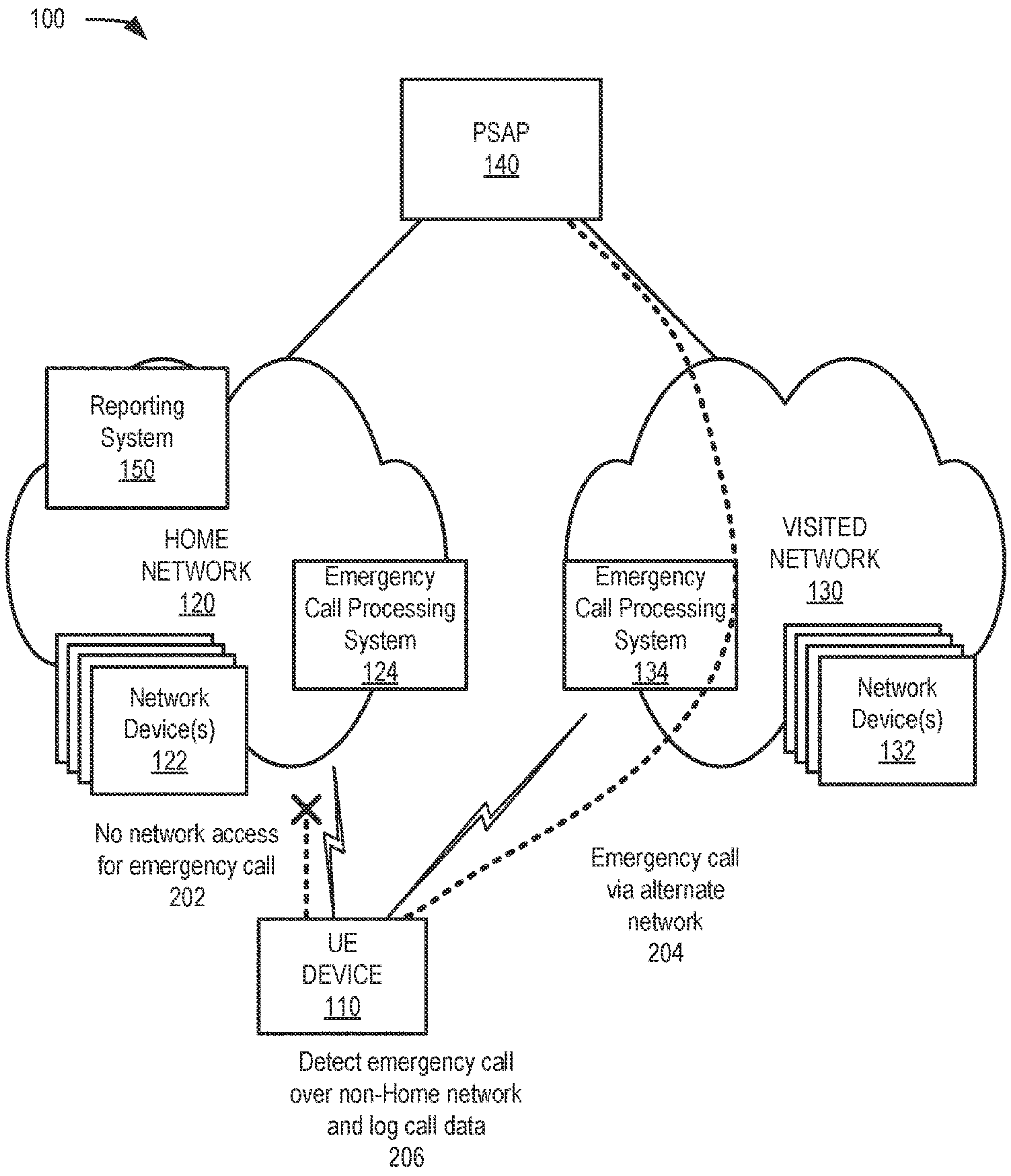
FIGS. 2A-2B are diagrams illustrating the emergency call outage reporting service according to an exemplary scenario.
Figure 2B:
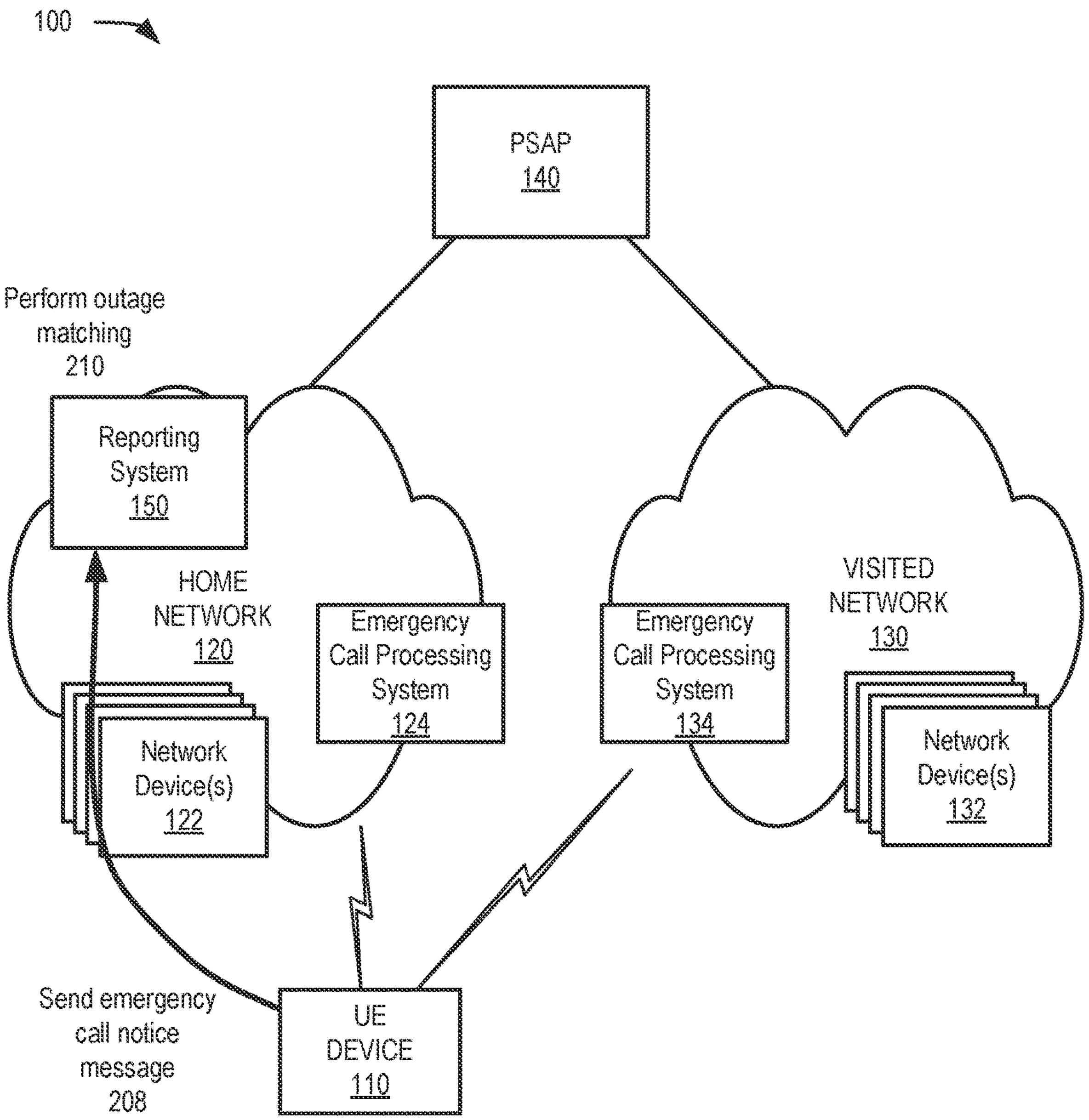

FIGS. 2A and 2B are diagrams illustrating an exemplary process of the emergency call outage reporting service in network environment 100. Referring to FIG. 2A, according to an exemplary scenario, a user (not shown) may use UE device 110 to initiate an emergency call. As indicated at reference 202, UE device 110 may detect that there is no network access available from home network 120. For example, UE device may not detect signals from a RAN associated with home network 120. Using known techniques, UE device 110 may attempt to access an alternate network to place the emergency call. Assuming visited network 130 is functional and accessible, UE device 110 may place the emergency call via visited network 130 and be connected to an appropriate PSAP 140 that can provide service to the location of UE device 110, as indicated at reference 204.

According to implementations described herein, UE device 110 may include software to support the emergency call outage reporting service. More particularly, UE device 110 may be configured to (a) detect when a notification for the emergency call outage reporting service is required and (b) generate an emergency call notice message for the home network.

To detect when a notification for the emergency call outage reporting service is required, UE device 110 may determine that the called number is a supported emergency number for the location of the device initiating the call. For example, the emergency number 911 may be a registered emergency number in one geographic region, and the number 999 may be a registered emergency number in a different geographic region. If UE device 110 detects that an emergency call has been successfully placed using a wireless network that is not the subscriber's home network (e.g., not home network 120), UE device 110 may be triggered to generate an emergency call notice message. As shown at reference 206, in response to connecting call 204, UE device 110 may detect that an emergency call has been placed over a visited network 130 and log call data for an emergency call notice message. The logged call data may include, for example, the date, time, and information identifying a location of the call; a network ID of the network that failed (e.g., home network 120); and a network ID of the network that was used to deliver the call (e.g., visited network 130). If a network connection that supports a non-emergency message transfer is not available, UE device 110 may store (or enqueue) an emergency call notice message with the call data for delivery when a network connection is available.

Referring to FIG. 2B, UE device 110 may send the emergency call notice message to reporting system 150, as indicated at reference 208. For example, UE device 110 may be configured with a predefined address (e.g., a fully qualified domain name (FQDN)) of the home network's reporting system (e.g., reporting system 150). The emergency call notice message may be sent using any of multiple different networks including home network 120, a roaming carrier (e.g., visited network 130), a WPAN (e.g., Bluetooth), a WLAN (e.g., Wi-Fi), a mesh network (e.g., ZigBee), or any other public infrastructure capable of delivering a message without user subscription to a known server URL. In one implementation, UE device 110 may send the emergency call notice message in an encrypted format. In other implementations, hypertext transfer protocol-secure (HTTPS), short message service (SMS), radio transfer technology (RTT), or other communications mechanisms may be used, based on availability of network connections at the time of the failed call.

Reporting system 150 may receive the emergency call notice message from UE device 110. Generally, reporting system 150 may parse and analyze the received data to determine whether or not a reportable emergency call system outage has occurred, as well as capturing data that could be used to represent the size and nature of the outage. Actions of reporting system 150 are described further below in connection with FIG. 4.

Although FIGS. 2A and 2B illustrate an exemplary embodiment of a process of the emergency call outage reporting service, according to other exemplary scenarios, the emergency call outage reporting service may perform additional operations, fewer operations, and/or different operations than those illustrated and described.

Figure 3:
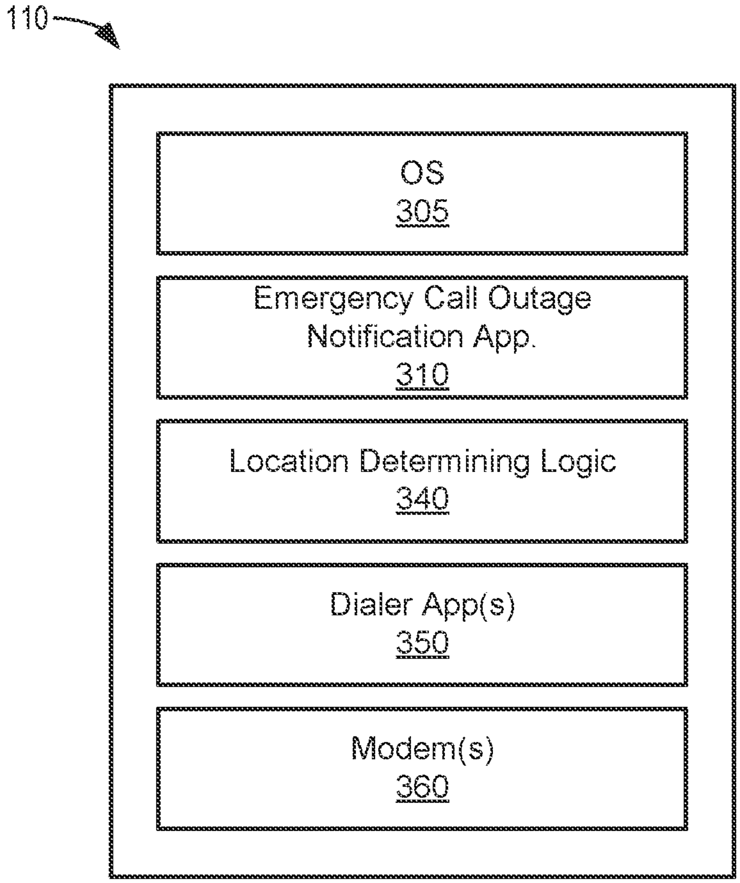
FIG. 3 is a diagram illustrating logical components of a User Equipment (UE) device, according to an implementation.

FIG. 3 is a diagram illustrating logical components of UE device 110 for use with the emergency call outage reporting service, according to implementations described herein. As shown in FIG. 3, UE device 110 may include an operating system (OS) 305, an emergency call outage notification application (app) 310, location determining logic 340, one or more dialer apps 350, and modem(s) 360.

OS 305 may perform various support functions for components of UE device 110. For example, OS 305 may provide interfaces between applications (e.g., dialer apps 350, emergency call outage notification application 310, etc.) and other components (e.g., communication interfaces, etc.). In another example, OS 305 may provide a TCP/IP stack to support communication applications. In addition, OS 305 may provide other functions, such as thread management, memory management, storage management, etc.

Emergency call outage notification application 310 may perform one or more functions of UE device 110 for the emergency call outage reporting service described above.

For example, emergency call outage notification application 310 may detect when a notification for the emergency call outage reporting service is required and generate an emergency call notice message for home network 120. Emergency call outage notification application 310 may detect when an emergency call is placed over a visited network 130 and, in response, generate an emergency call notice message (e.g., corresponding to reference 208 of FIG. 2B). As described further below, the emergency call notice message may include, among other data, information that identifies the location of UE device 110 at the time of the emergency call. Emergency call outage notification application 310 may be configured with an address (e.g., a network address, IP address, etc.) for proving emergency call notice messages to reporting system 150. In one implementation, emergency call outage notification application 310 may be a carrier-specific application that may be preloaded by an original equipment manufacturer (OEM).

Location determining logic 340 may identify location coordinates for UE device 110. According to one implementation, location determining logic 340 may use known technologies and techniques to provide location services, such as, for example, satellite-based positioning (e.g., GPS, differential GPS (DGPS), GLONASS, etc.) or cellular-based positioning (e.g., triangulation, Enhanced Observed Time Difference (E-OTD), Uplink Time Difference of Arrival (U-TDOA), assisted GPS, etc.). Location information from location determining logic 340 may be used to identify the location of UE device 110 at the time an emergency call is placed. Information from location determining logic 340 may be provided to emergency call outage notification application 310 directly or via OS 305, for example.

Dialer apps 350 may include a native dialer application or another dialer application that provides a user interface to initiate and receive phone calls, including emergency calls. In one implementation, a dialer app 350 may be integrated with a list of contacts to automatically initiate an outbound call of a selected contact, such as an emergency contact associated with the number 911.

Modem 360 may perform communication-related functions, including establishing connections and/or sessions between UE device 110 and networks 120/130, delivering messages from/to UE device 110 and to/from networks 120/130, perform modulation/demodulation, perform signal processing, etc. Modem 360 may establish a connection to a subscriber's home network 120, when available, or to a visited network 130 for an emergency call.

Although FIG. 3 shows exemplary logical components of UE device 110, in other implementations, UE device 110 may include fewer components, different components, differently arranged components, or additional components than depicted in FIG. 3. In addition, functions described as being performed by one of the logical components in FIG. 3 may alternatively be performed by another one or more of the components of UE device 110. For example, in another implementation, functions of emergency call outage notification application 310 may be integrated into operating system 305.

Figure 4:
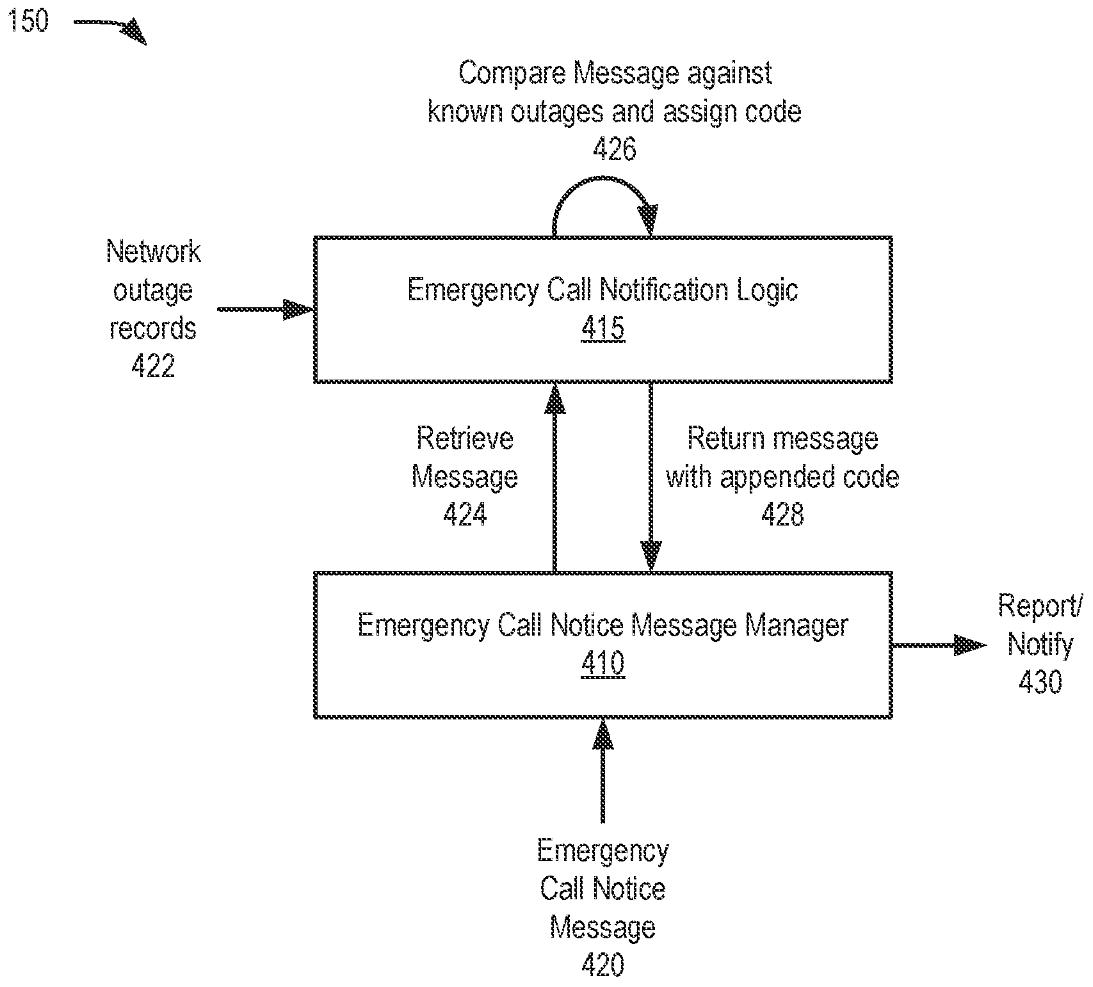
FIG. 4 is a diagram of exemplary functional components of the reporting system of the network depicted in FIG. 1.

FIG. 4 is a block diagram illustrating communications among components of reporting system 150. Reporting system 150 may be a standalone system or distributed within one or multiple devices of network environment 100. The components of reporting system 150 may be implemented, for example, via processor 710 executing instructions from memory 715, as described in connection with FIG. 7. Alternatively, some or all of the components included in reporting system 150 may be implemented via hard-wired circuitry. As shown in FIG. 4, reporting system 150 may include an emergency call notice message manager 410 and emergency call notification logic 415.

Emergency call notice message manager 410 may receive emergency call notice messages from UE devices 110. For example, emergency call notice message manager 410 may be assigned the predefined address (e.g., FQDN) of reporting system 150, such that emergency call notice messages 420 (e.g., corresponding to reference 208 of FIG. 2B) from UE device 110 are delivered to emergency call notice message manager 410. According to an implementation, emergency call notice message manager 410 may include a database, via which emergency call notice message manager 410 may accept and aggregate emergency call notice messages 420 from multiple different UE devices 110.

Emergency call notice message manager 410 may also include a PSAP mapping feature to associate impacted areas (e.g., UE device locations associated with a network outage) with PSAP 140 facilities. Thus, in one implementation, emergency call notice message manager 410 may initiate an investigation that triggers an outage notification by another system (e.g., an existing outage notification tool). According to another implementation, when outage reporting is required, emergency call notice message manager 410 may provide outage reports to an appropriate PSAP 140 affected by an outage (e.g., as a backup to existing outage notification tools).

Emergency call notice message 420 may include but is not limited to, for example, the emergency call date/time, the calling party number, the called party number, information that identifies the device-based location, and the network ID used to complete the emergency call. The emergency call date/time may include, for example, a Coordinated Universal Time (UTC) in seconds. In some implementations, the emergency call date/time may include a start connection time. In other implementations, the emergency call date/time may also include an end time. The calling party number may include a unique identifier for the calling device (UE device 110), such as Subscription Permanent Identifier (SUPI), a Subscription Concealed Identifier (SUCI), an International Mobile Subscriber Identity (IMSI), and a Mobile Station International Subscriber Directory Number (MSISDN). The called party number may include the emergency number UE device 110 used to place the emergency call (e.g., 911, 999, etc.). The device-based location information may include location coordinates (e.g., non-third-party determined coordinates) known by UE device 110 at the time the emergency call was placed. In another implementation, location information may be in the form of cellular tower triangulation information collected from the mobile communications device. In still other implementations, location information may be in the form of a single tower or base station location collected from the mobile communications device. The network ID used to complete the emergency call may include a network ID of the visited network, such as a network ID that uniquely identifies visited network 130. For example, the network ID may include a Public Land Mobile Network (PLMN) ID that uniquely identifies a cellular network. In other implementations, emergency call notice message 420 may include different or additional information to enable comparison with network outage information.

Emergency call notification logic 415 may obtain network outage records 422. For example, home network 120 may include an outage reporting system (not shown) from which outage records may be derived. Outage records may include time/location/coverage outage information for home network 120. Thus, emergency call notification logic 415 may retrieve outage records for known outages within home network 120. Emergency call notification logic 415 may also retrieve 424 emergency call notice messages 420 from emergency call notice message manager 410. Each incoming emergency call notice messages 420 may be compared against known outages from network outage records 422.

Based on the comparison, emergency call notification logic 415 may assign the incoming emergency call notice messages 420 to a category. Examples of categories include (1) known outages, (2) unreported outage—inside, and (3) unreported outage—outside. The known outage category may indicate that the message (e.g., emergency call notice message 420) is related to a known outage based on date, time, and location correlation between emergency call notice message 420 and network outage records 422. The unreported outage—inside category may indicate that the message is not related to a known outage and the reported location is within a coverage area of home network 120. The unreported outage—outside category may indicate that the message is not related to a known outage and the reported location is not within a coverage area of home network 120.

The categories of incoming emergency call notice messages 420 described above are exemplary. In other implementations, additional or different categories may be used. For example, in another implementation, criteria for UE device 110 to generate an emergency call notice message may include successfully placed emergency calls that fail to include device location information. Thus, an additional category may be used to reflect that emergency call delivery was not impacted, but third-party location determination is offline. As indicated at references 426, emergency call notification logic 415 may append a code to the emergency call notice message 420 based on the assigned category.

As shown at reference 428, emergency call notification logic 415 may return the emergency call notice message 420 with the appended code back to emergency call notice message manager 410, reflecting the result of the analysis. Emergency call notice message manager 410 may use the code to manage routing/forwarding 430 of outage notifications. For example, if the code indicates a known outage category, emergency call notice message manager 410 may not report the message to avoid redundancy. If the code indicates the unreported outage—inside category, the message may be reported to a service team for investigations. If the code indicates the unreported outage—outside, the message may be reported to a network improvement group for investigation. In some implementations, emergency call notice message manager 410 may store the emergency call notice message 420 with the appended code in the database for future retrieval and analysis.

Although FIG. 4 shows exemplary components of reporting system 150, in other implementations, reporting system 150 may contain fewer components, different components, differently arranged components, or additional components than depicted in FIG. 4. Alternatively, or additionally, one or more components of reporting system 150 may perform one or more other tasks described as being performed by one or more other components of reporting system 150.

Figure 5:
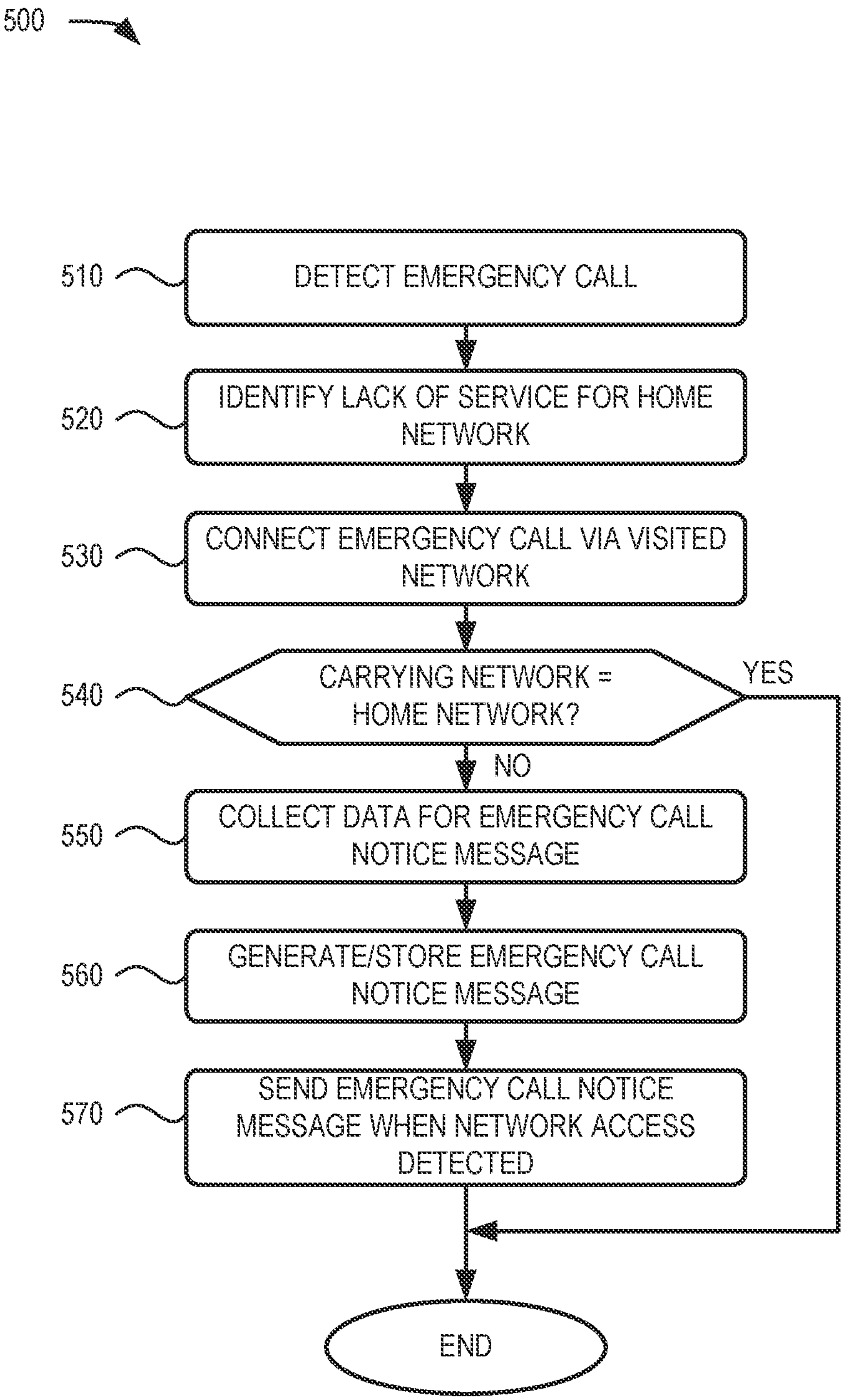
FIG. 5 is a flow chart of example operations by a user device for the emergency call outage reporting service, according to an implementation.

FIG. 5 is a process flow 500 illustrating exemplary operations by a UE device for the emergency call outage reporting service. In one implementation, the operations of process flow 500 may be performed by UE device 110. For example, operations of process flow 500 may be performed by a modem, an operating system, and/or a client application of UE device 110. In another implementation, some or all of the operations of process flow 500 may be performed by UE device 100 in conjunction with one or more of network devices of network environment 100.

Process 500 may include detecting initiation of an emergency call (block 510), identifying a lack of service for a home network (block 520), and connect the emergency call via a visited network (block 530). For example, a user may initiate an emergency call using UE device 110. UE device 110 may determine that no network connection is available through home network 120 and, thus, UE device 110 may attach to visited network 130 to place the emergency call.

Process 500 may further include determining the carrying network for the emergency call is the same as the home network (block 540). For example, the operating system of UE device 110 may identify the network identifier of the visited network 130 used for the emergency call against the network identifier of home network 120. Based on the comparison of the network identifiers, UE device 110 may determine if the emergency call was conducted over the subscriber's home network or a visited network.

If the carrying network for the emergency call is not the same as the home network (block 540—No), process 500 may include collecting data for an emergency call notice message (block 550), generating and/or storing the emergency call notice message (block 560) and sending the emergency call notice message when network access is detected (block 570). For example, by querying OS 305 or other systems within UE device 110, emergency call outage notification application 310 may collect emergency call data from dialer app 350, location determining logic 340, OS 305, and/or other applications available on UE device 110. The emergency call data may include the emergency call date/time, the calling party number, the called party number, information identifying the device-based location, and the network ID used to complete the emergency call. UE device 110 may generate emergency call notice message 420 that includes the collected emergency call data. When UE device 110 is able to connect to a network that permits non-emergency access, UE device 110 may send emergency call notice message 420 to a designated network address for reporting system 150.

If the carrying network for the emergency call is the same as the home network (block 540—Yes) or after sending the emergency call notice message, process 500 may end.

Figure 6:
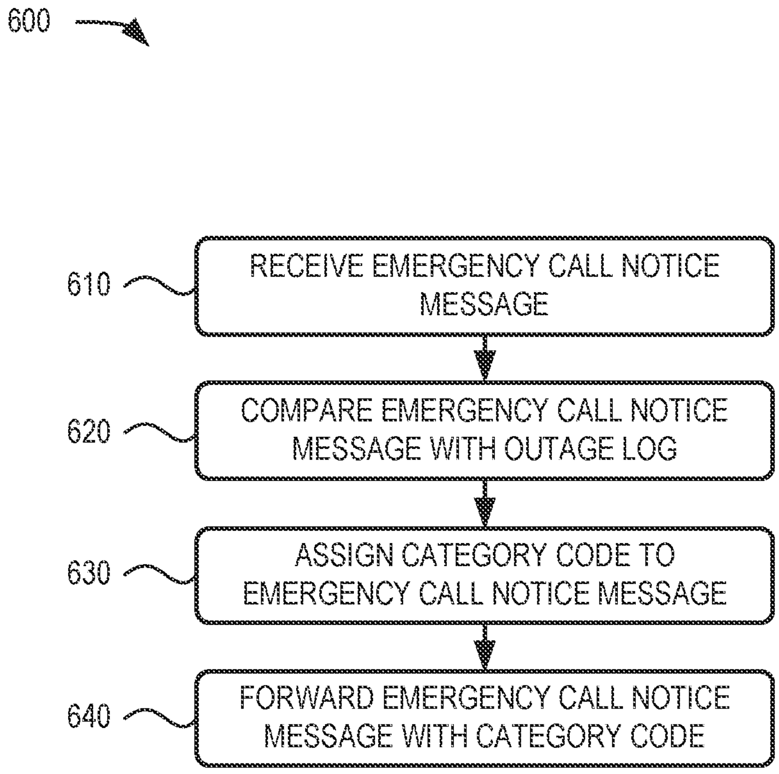
FIG. 6 is a flowchart of example operations by a network device for the emergency call outage reporting service, according to an implementation.

FIG. 6 is a process flow 600 illustrating exemplary operations by a network device for the emergency call outage reporting service. In one implementation, the operations of process flow 600 may be performed by reporting device 150. In another implementation, some or all of the operations of process flow 600 may be performed by reporting device 150 in conjunction with one or more of network devices of network environment 100.

Process 600 may include receiving an emergency call notice message (block 610) and comparing the emergency call notice with a network outage log (block 620). For example, reporting device 150 (e.g., emergency call notice message manager 410) may receive an emergency call notice message 420 from UE device 110. Reporting device 150 (e.g., emergency call notification logic 415) may compare incoming emergency call notice message 420 against known outages from network outage records. Based on the comparison, reporting device 150 may assign the incoming emergency call notice messages 420 to a category, such as the known outage category, the unreported outage—inside category, or the unreported outage—outside category described above.

Process 600 may further include assigning a category code to the emergency call notice message (block 630) and forwarding the emergency call notice message with the appended message code (block 640). For example, reporting system 150 (e.g., emergency call notification logic 415) may append a code to the emergency call notice message 420 based on the assigned category. Based on the code, reporting system 150 (e.g., emergency call notice message manager 410) may report an outage to a contact point within home network 120.

FIG. 6 illustrate an exemplary process 600 of the emergency call outage reporting service, however, according to other embodiments, process 600 may include additional operations, fewer operations, and/or different operations than those illustrated in FIG. 6 and described herein.

Figure 7:
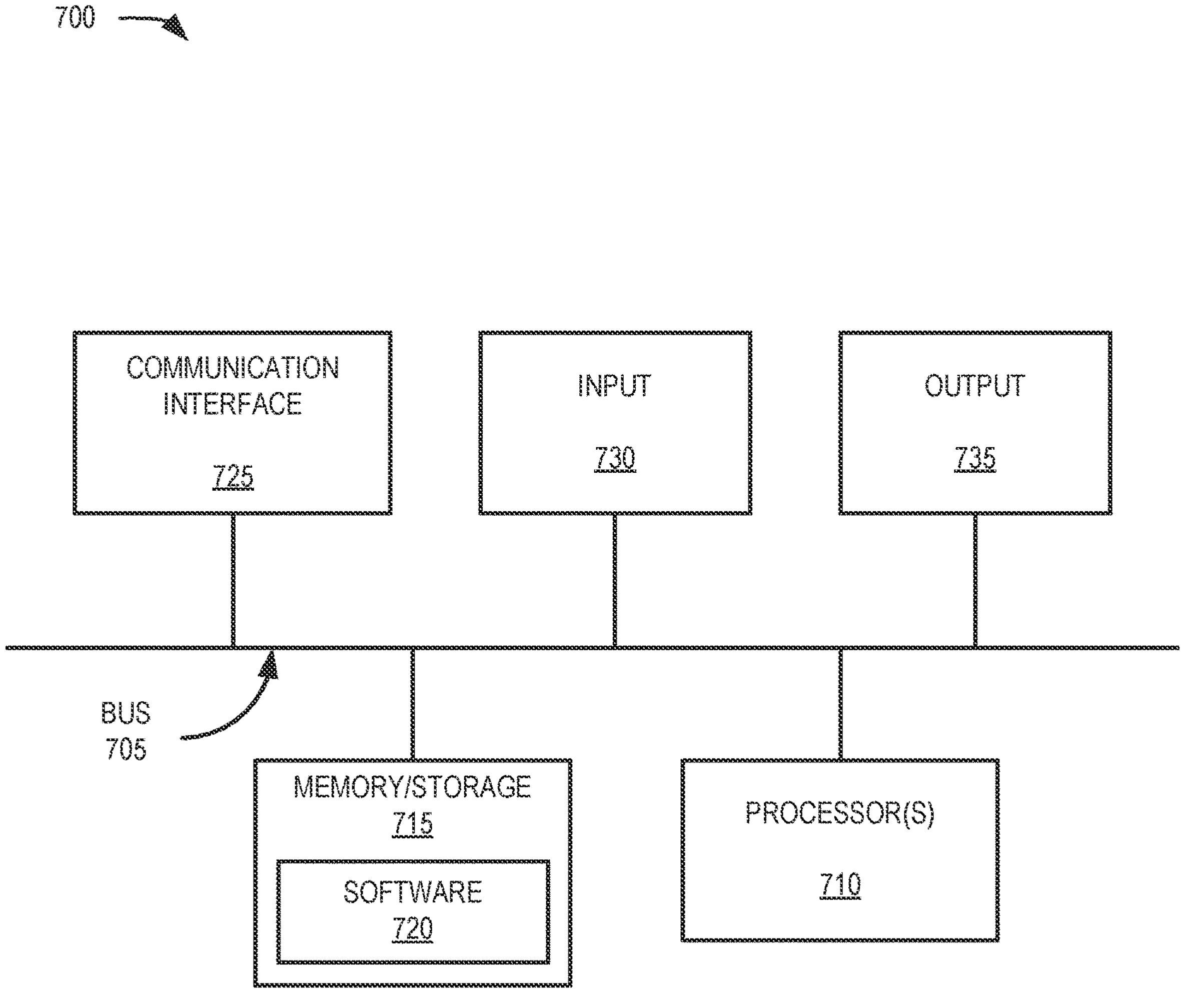
FIG. 7 is a diagram illustrating exemplary components of a device that may correspond to one or more of the devices illustrated herein.

FIG. 7 is a diagram illustrating exemplary components of a device 700 that may correspond to one or more of the devices described herein. For example, device 700 may correspond to components included in UE devices 110, home network 120, visited network 130, and/or other elements illustrated in FIGS. 1-3. As illustrated in FIG. 7, according to an exemplary embodiment, device 700 includes a bus 705, one or more processors 710, memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, and/or clocks.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc. Processor 710 may be a dedicated component or a non-dedicated component (e.g., a shared resource).

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random-access memory (DRAM), cache, read only memory (ROM), a programmable read only memory (PROM), a static random-access memory (SRAM), a single in-line memory module (SIMM), a dual in-line memory module (DIMM), a flash memory (e.g., a NAND flash, a NOR flash, etc.), and/or some other type of memory.

Memory/storage 715 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 715 may include a drive for reading from and writing to the storage medium.

Memory/storage 715 may be external to and/or removable from device 700, such as, for example, a Universal Serial Bus (USB) memory stick, a dongle, a hard disk, mass storage, off-line storage, network attached storage, or some other type of storing medium. Memory/storage 715 may store data, software, and/or instructions related to the operation of device 700.

Software 720 includes an application or a program that provides a function and/or a process. Software 720 may include an operating system. Software 720 is also intended to include firmware, middleware, microcode, hardware description language (HDL), and/or other forms of instruction. For example, according to an implementation, software 720 may be used by UE device 110 and/or reporting system 150 to implement portions of the emergency call outage reporting service.

Communication interface 725 permits device 700 to communicate with other devices, networks, systems, devices, and/or the like. Communication interface 725 includes one or multiple wireless interfaces and/or wired interfaces. For example, communication interface 725 may include one or multiple transmitters and receivers, or transceivers (e.g., radio frequency transceivers). Communication interface 725 may include one or more antennas. For example, communication interface 725 may include an array of antennas. Communication interface 725 may operate according to a protocol stack and a communication standard. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 735 permits an output from device 700. For example, output 735 may include a speaker, a display, a light, an output port, and/or some other type of visual, auditory, tactile, etc., output component. According to some embodiments, input 730 and/or output 735 may be a device that is attachable to and removable from device 700.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

As described herein, a method, a device, and a non-transitory storage medium provide an emergency call outage reporting service. In one implementation, a network device receives an emergency call notice message. The emergency call notice message indicates an emergency call was placed from a UE device using a visited network. The network device compares the emergency call notice message with outage data for a home network and reports, based on the comparing, a network outage associated with the emergency call notice message. In another implementation, a UE device detects that an emergency call was placed from the UE device over a visited network, collects information identifying a device-based location at the time of the emergency call, generates an emergency call notice message that includes the information identifying the device-based location, and sends the emergency call notice message to a network device in the home network.

The foregoing description of embodiments provides illustrations but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive. For example, while reporting system 150 is described herein in the context of residing in a home network, in other implementations, reporting system 150 may be included within another network, such as a third-party network.

In addition, while series of blocks have been described with regard to the processes illustrated in FIGS. 5 and 6, and series of signals with respect to FIGS. 2A-2B the order of the blocks and/or signals may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 710, etc.), or a combination of hardware and software. The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 710) of a computational device. A non-transitory storage medium includes one or more of the storage mediums described in relation to memory 715.

To the extent the aforementioned embodiments collect, store or employ personal information provided by individuals, or any other user data or subscription data, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method, comprising:

receiving, by one or more network devices in a registered home network for a user equipment (UE) device, an emergency call notice message from the UE device, wherein the emergency call notice message indicates that an emergency call was successfully placed from the UE device using a visited network;

comparing, by the one or more network devices, the emergency call notice message with outage data for the home network; and reporting, by the one or more network devices and based on the comparing, a network outage associated with the emergency call notice message.

2. The method of claim 1, wherein the emergency call notice message includes:

a time of the emergency call, a calling party identifier of the emergency call, a called number of the emergency call, information that identifies a device-based location at the time of the emergency call, and a network identifier of the visited network used for the emergency call.

3. The method of claim 1, wherein the reporting comprises:

assigning a category code to the emergency call notice message based on the comparing.

4. The method of claim 3, wherein the assigning further comprises identifying a category for the emergency call notice message as one of:

a first category indicating the emergency call notice message is consistent with a known outage in the home network, a second category indicating that the emergency call notice message is not related to a known outage and the device-based location is within a coverage area of the home network, or a third category indicating that the emergency call notice message is not related to a known outage and the device-based location is not within a coverage area of the home network.

5. The method of claim 1, wherein receiving the emergency call notice message comprises:

receiving the emergency call notice message via the home network.

6. The method of claim 1, wherein receiving the emergency call notice message comprises:

receiving the emergency call notice message from the UE device after the emergency call is connected to a public safety answering point (PSAP).

7. The method of claim 1, wherein the home network includes a mobile network.

8. The method of claim 1, wherein the comparing comprises:

obtaining reported network outage data for the home network, and comparing the network outage data with a time and device-based location information provided in the emergency call notice message.

9. One or more network devices, comprising:

one or more processors configured execute instructions to:

receive, in a registered home network for a user equipment (UE) device, an emergency call notice message from the UE device, wherein the emergency call notice message indicates that an emergency call was successfully placed from the UE device using a visited network;

compare the emergency call notice message with outage data for the home network; and report, based on the comparing, a network outage associated with the emergency call notice message.

10. The one or more network devices of claim 9, wherein the emergency call notice message includes:

a time of the emergency call, a calling party identifier of the emergency call, a called number of the emergency call, information identifying a device-based location at the time of the emergency call, and a network identifier of the visited network used for the emergency call.

11. The one or more network devices of claim 9, wherein, when reporting the network outage, the processors are further to execute instructions to:

assign a category code to the emergency call notice message based on the comparing.

12. The one or more network devices of claim 11, wherein, when assigning the category code, the one or more processors are further to execute instructions to:

identify a category for the emergency call notice message as one of:

a first category indicating the emergency call notice message is consistent with a known outage in the home network, a second category indicating that the emergency call notice message is not related to a known outage and the device-based location is within a coverage area of the home network, or a third category indicating that the emergency call notice message is not related to a known outage and the device-based location is not within a coverage area of the home network.

13. The one or more network devices of claim 9, wherein, when receiving the emergency call notice message, the processors are further to execute instructions to:

receive the emergency call notice message via the home network.

14. The one or more network devices of claim 9, wherein, when receiving the emergency call notice message, the processors are further to execute instructions to:

receive the emergency call notice message from the UE device after the emergency call is connected to a public safety answering point (PSAP).

15. The one or more network devices of claim 9, wherein the one or more network devices include a reporting system for the home network of the UE device.

16. The one or more network devices of claim 9, wherein, when reporting the network outage, the processors are further to execute instructions to:

identify a public safety answering point (PSAP) associated with device-based location information provided in the emergency call notice message.

17. A method comprising:

detecting, by a user equipment (UE) device, that an emergency call was successfully placed from the UE device over a visited network that is not registered as a primary network for the UE device;

collecting, by the UE device, information identifying a device-based location at the time of the emergency call;

generating, by the UE device, an emergency call notice message that includes the information identifying the device-based location; and sending, by the UE device, the emergency call notice message.

18. The method of claim 17, wherein the emergency call notice message further includes:

a time of the emergency call, a calling party identifier of the emergency call, a called number of the emergency call, and a network identifier of the visited network used for the emergency call.

19. The method of claim 17, wherein sending the emergency call notice message includes:

sending the emergency call notice message to a network device in a home network of the UE device.

20. The method of claim 17, further comprising:

enqueuing, after the generating, the emergency call notice message until the UE device connects to a network that permits non-emergency access.

* * * * *